(12) United States Patent
Mita et al.

(10) Patent No.: US 6,305,870 B1
(45) Date of Patent: Oct. 23, 2001

(54) METAL CLIP AND, FIXING STRUCTURE FOR FIXING SHAFTLIKE MEMBER TO MOUNT MEMBER HAVING THROUGH HOLE, WITH THE METAL CLIP

(75) Inventors: Kazuhiro Mita, Yokohama; Satoru Sasagawa, Wako, both of (JP)

(73) Assignees: Piolax Inc., Kanagawa-ken; Honda Giken Kogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/045,557

(22) Filed: Mar. 20, 1998

(30) Foreign Application Priority Data

Mar. 21, 1997 (JP) .................................................. 9-085538

(51) Int. Cl.⁷ ....................................................... F16B 2/24
(52) U.S. Cl. .......................... 403/254; 403/155; 411/522
(58) Field of Search .................................. 403/155, 154, 403/150, 256, 257, 261, 254, 355, 319; 64/517, 520, 522, 528, 529

(56) References Cited

U.S. PATENT DOCUMENTS

| | | | |
|---|---|---|---|
| 2,034,559 | * | 3/1936 | Brunner ................................ 411/520 |
| 2,244,427 | * | 6/1941 | Miller ................................ 411/520 X |
| 2,278,708 | * | 4/1942 | Miller ................................ 411/522 X |
| 2,487,803 | * | 11/1949 | Heimann ................................ 411/517 |
| 2,577,748 | * | 12/1951 | Gillespie . |
| 2,748,906 | * | 6/1956 | Flora . |
| 2,755,698 | * | 7/1956 | Wurzel ................................ 411/517 |
| 3,012,744 | * | 12/1961 | Damon et al. . |
| 3,178,987 | * | 4/1965 | Reese et al. . |
| 3,270,124 | * | 8/1966 | Rawls et al. . |
| 3,302,867 | * | 2/1967 | Roffy . |
| 3,442,171 | * | 5/1969 | Engelmann ........................... 411/520 |
| 3,867,871 | * | 2/1975 | Shore .................................... 92/258 X |
| 3,869,179 | * | 3/1975 | Ricca et al. ....................... 384/155 X |
| 4,113,397 | * | 9/1978 | Snyder .................................. 403/154 |
| 4,364,685 | * | 12/1982 | Janz ................................... 403/108 X |
| 4,593,431 | * | 6/1986 | Sandberg et al. ................... 16/381 X |
| 4,623,050 | * | 11/1986 | Copp .................................. 188/340 X |
| 4,735,534 | * | 4/1988 | Oehlke ............................... 411/177 X |
| 4,951,550 | * | 8/1990 | Ohki et al. ....................... 91/369.3 X |
| 5,031,511 | * | 7/1991 | Villata ................................ 92/128 X |
| 5,131,894 | * | 7/1992 | Hilker ............................... 475/230 X |
| 5,410,899 | * | 5/1995 | McConnell ......................... 70/370 X |
| 5,494,368 | * | 2/1996 | Matthews . |
| 5,518,332 | * | 5/1996 | Katoh .................................. 403/155 |

FOREIGN PATENT DOCUMENTS

| | | | |
|---|---|---|---|
| 0326522 | * | 8/1989 | (EP) . |
| 287753 | * | 3/1928 | (GB) . |
| 1288840 | * | 9/1972 | (GB) . |
| 80/02059 | * | 10/1980 | (WO) . |

\* cited by examiner

*Primary Examiner*—Harry C. Kim
(74) *Attorney, Agent, or Firm*—Ladas & Parry

(57) ABSTRACT

Provided is a metal clip to facilitate the inserting work. A metal clip for fixing a shaftlike member to a mount member having a through hole is constructed in such structure that a U-shaped slit is formed in an open shape in the body and that at outer edges of two side pieces defining the U-shaped slit elastic legs are provided for pushing the two side pieces up away from a surface of the mount member around the through hole, whereby the two side pieces can be inserted into a small-diameter groove of the shaftlike member while keeping the two side pieces up away from the surface of the mount member.

2 Claims, 4 Drawing Sheets

METAL CLIP AND, FIXING STRUCTURE FOR FIXING SHAFTLIKE MEMBER TO MOUNT MEMBER HAVING THROUGH HOLE, WITH THE METAL CLIP

BACKGROUND OF THE INVENTION

1. Field of the Invention

The present invention relates to a metal clip for fixing a shaftlike member to a mount member having a through hole and a fixing structure for fixing the shaftlike member to the mount member having the through hole, by use of the metal clip.

2. Related Background Art

One of the conventional fixing structures of this type is, for example, the one described in Japanese Laid-open Utility Model Application No. 64-49784.

This conventional fixing structure, though not illustrated specifically, is such that a panel of the mount member is bored to form a through hole, through which the tip portion of the shaftlike member is inserted, and that the metal clip is fixedly fitted to the tip portion of the shaftlike member inserted in the through hole, whereby the panel and the shaftlike member are fixed to each other through elasticity of the metal clip.

For this arrangement, the shaftlike member is constructed in such structure that a head to be inserted into the through hole of the panel is formed at the tip thereof of the shaftlike member, a receiving shoulder having a larger diameter than that of the through hole of the panel is formed a fixed distance apart below the head, a step to fit the through hole of the panel is formed on the top surface of the receiving shoulder, and an annular groove having a small diameter is formed between the top surface of the step and the bottom surface of the head.

Further, the metal clip is constructed in such structure that a U-shaped slit smaller than the above head but larger than the small-diameter groove is formed in an open shape in the body of a sheet shape molded of an elastic metal sheet, center portions of two side pieces defining the U-shaped slit are curved upward, and the free ends of the two side pieces are folded back upward.

Then, the panel and the shaftlike member are fixed in the following manner in practice. When the head of the shaftlike member is inserted into the through hole of the panel, the panel is received by the large-diameter receiving shoulder thereon. At the same time as it, the step is fitted in the through hole of the panel. After that, the two side pieces are inserted into the annular small-diameter groove while the portion of the small-diameter groove of the shaftlike member is made to face the U-shaped slit of the metal clip, whereby the two side pieces of the metal clip are elastically nipped between the panel surface and the bottom surface of the head. Thus, the panel and the shaft like member are fixed through elasticity of the metal clip achieved from this nipping state.

The conventional fixing structure, however, had the following problem. Although the free ends of the two side pieces of the metal clip were folded back upward, the two side pieces were basically inserted into the small-diameter groove of the shaftlike member along the panel surface around the through hole of the panel. For example, if there was a burr around the edge of the through hole of the panel or if there was a difference between the thickness of the panel and the height of the step of the shaftlike member, the free ends of the two side pieces were often caught by the burr or the like upon insertion, so as not to be inserted smoothly into the small-diameter groove.

SUMMARY OF THE INVENTION

The present invention has been accomplished in order to effectively solve the problem of the conventional fixing structure including the metal clip itself, and adopts the structure of a metal clip for fixing a shaftlike member to a mount member having a through hole, wherein a U-shaped slit is formed in an open shape in the body and wherein at outer edges of two side pieces defining the U-shaped slit elastic legs are provided for pushing the two side pieces up away from a surface of the mount member around the through hole.

Another aspect of the present invention employs such structure that a plurality of elastic legs are provided front and rear in an inserting direction of the two side pieces.

Another aspect of the present invention employs such structure that tip portions of the elastic legs are folded back upward and that turn center edges of the tip portions are in contact with the surface of the mount member.

Still another aspect of the present invention employs such structure that the tip portions of the elastic legs provided front and rear are connected by connecting pieces folded back upward and that turn center edges of the connecting pieces are in contact with the surface of the mount member.

Still another aspect of the present invention employs a fixing structure for fixing a shaftlike member to a mount member having a through hole, with a metal clip, wherein the shaftlike member is constructed so that a head to be inserted into the through hole of the mount member is formed at the tip, a receiving shoulder having a larger diameter than that of the through hole is formed below the head, a step to fit the through hole is formed on a top surface of the receiving shoulder, and an annular groove having a small diameter is formed between the step and the head; and the metal clip is constructed so that a U-shaped slit smaller than the head but larger than the groove having the small diameter is formed in an open shape in the body and at outer edges of two side pieces defining the U-shaped slit elastic legs are provided for pushing the two side pieces up away from the surface of the mount member around the through hole.

Accordingly, even if there is the burr or the like at the edge of the through hole of the mount member, the free ends of the two side pieces can be inserted into the small-diameter groove of the shaftlike member while keeping the two side pieces of the metal clip a necessary rise amount above from the surface of the mount member by the action of the elastic legs; whereby the free ends of the two side pieces can be inserted smoothly into the small-diameter groove of the shaftlike member without being caught by the burr or the like. Therefore, the inserting work of the two side pieces of the metal clip can be done well.

In another aspect of the present invention, while the two side pieces of the metal clip are inserted into the small-diameter groove, they can be inserted by deflecting the elastic legs in order from those provided on the front side in the inserting direction. Also from this point, the inserting work can be done better. In another aspect of the present invention, the turn center edges of the elastic legs or the connecting pieces are in contact with the surface of the mount member, whereby movement and inward or outward deflection of the elastic legs can be guided without strain and without damaging the surface of the mount member.

According to still another aspect of the present invention, the mount member can be held for sure by the arrangement in which the height of the step of the shaftlike member to fit the through hole of the mount member is greater than the thickness of the mount member. This prevents the mount member in the fixed state from undesirably shaking and also prevents the edge of the through hole of the mount member from riding over the step, thereby eliminating the risk that the fixing state becomes unstable. While the two side pieces of the metal clip are inserted into the small-diameter groove of the shaftlike member, the free ends of the two side pieces can be inserted into the small-diameter groove while keeping the two side pieces the necessary rise amount above from the surface of the mount member by the action of the elastic legs; whereby the free ends of the two side pieces can be inserted smoothly into the small-diameter groove without being caught even by the high step. Accordingly, the certainly fixed state can be assured between the mount member and the shaftlike member and the inserting work of the two side pieces of the metal clip can be done well.

DESCRIPTION OF THE PREFERRED EMBODIMENTS

The present invention will be described in detail based on the preferred embodiment thereof illustrated. The fixing structure according to the embodiment is also predicated on the arrangement wherein a panel having a through hole, which is a mount member, and a shaftlike member such as a boss are fixed through a metal clip. The specific feature of the invention is the employment of the following structure for the above shaftlike member and metal clip.

Figure 1:
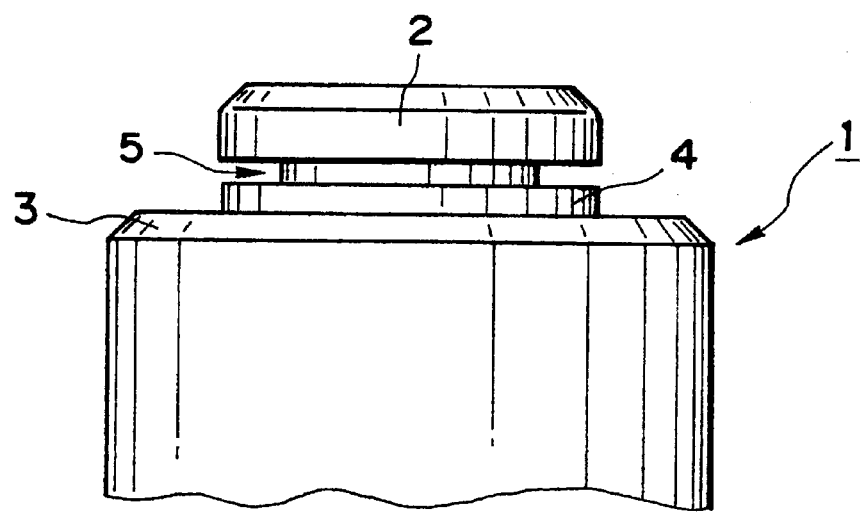
FIG. 1 is a front elevation of major part to show a shaftlike member used in the fixing structure according to an embodiment of the present invention.

First, the shaftlike member 1 is basically constructed in the following structure as shown in FIG. 1. In a similar way to the conventional members, the whole of the shaftlike member 1 is molded of a resin material in a cylindrical shape having a desired size, a head 2 to be inserted into the through hole of the panel is formed at the tip of the shaftlike member, a receiving shoulder 3 having a larger diameter than that of the through hole of panel is formed a fixed distance apart below the head 2, a step 4 to fit the through hole of the panel is formed on the top surface of the receiving shoulder 3, and an annular groove 5 with a small diameter is formed between the top surface of the step 4 and the bottom surface of the head 2.

Particularly, the height of the step 4 is greater than the thickness of the panel.

Figure 2:
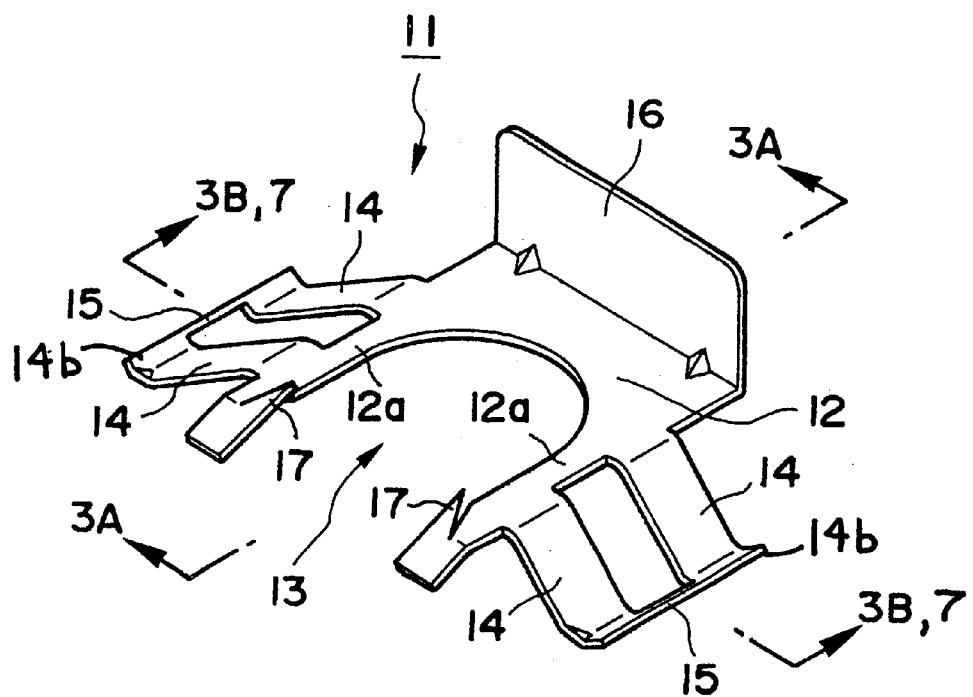
FIG. 2 is an overall perspective view to show a metal clip used in the fixing structure.
Figure 3A:
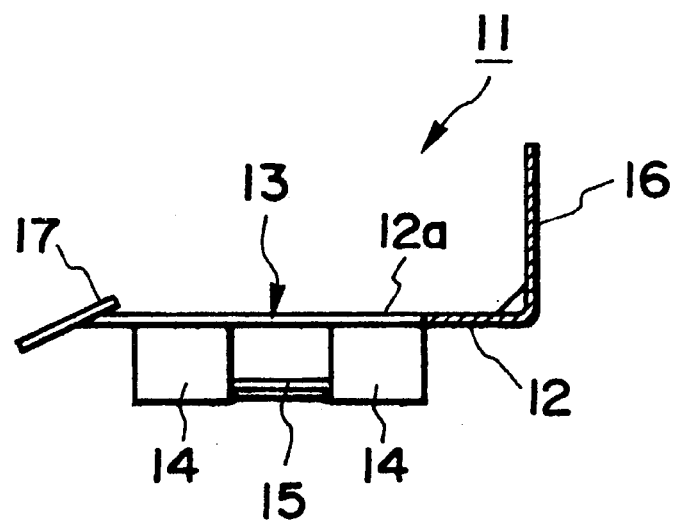
FIG. 3A is a cross-sectional view along line 3A—3A of FIG. 2.
Figure 3B:
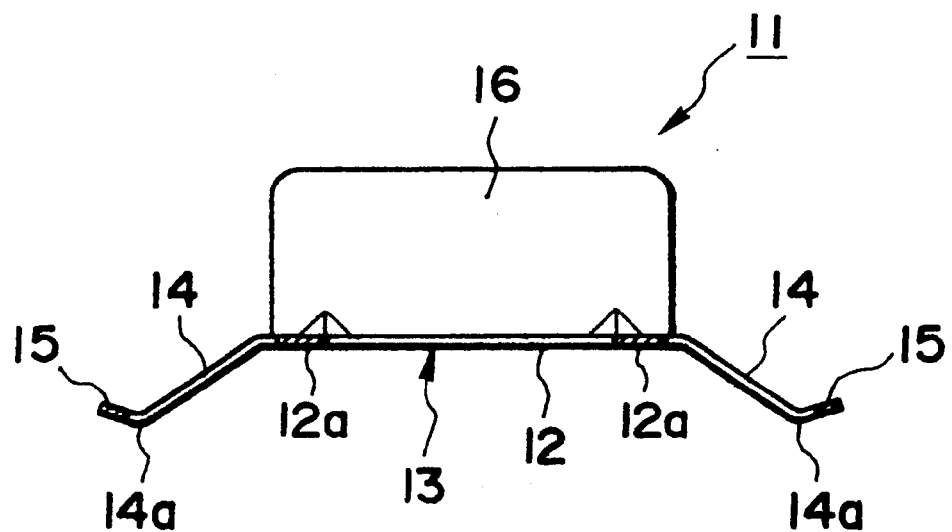
FIG. 3B is a cross-sectional view along line 3B—3B of FIG. 2.

Further, the metal clip 11 is constructed as shown in FIG. 2 and FIGS. 3A and 3B. A U-shaped slit 13 smaller than the head 2 but larger than the small-diameter groove 5 is provided in an open shape in rectangular body 12 formed of an elastic metal sheet. Two elastic legs 14 for pushing two side pieces 12a up away from the panel surface around the through hole are obliquely formed in a downwardly diverging state and are made integrally with the outer edges of the both side pieces 12a defining the U-shaped slit 13, the outer edges extending in the inserting direction of the clip. The tip portion 14b of each elastic leg 14 is folded back upward, and on each side only the folded edges are connected by connecting piece 15. In the drawing numeral 16 denotes a gripper formed in a folded shape at the base portion of body 12, and 17 stopper claws formed on the free end side of the both side pieces 12a.

Figure 4:
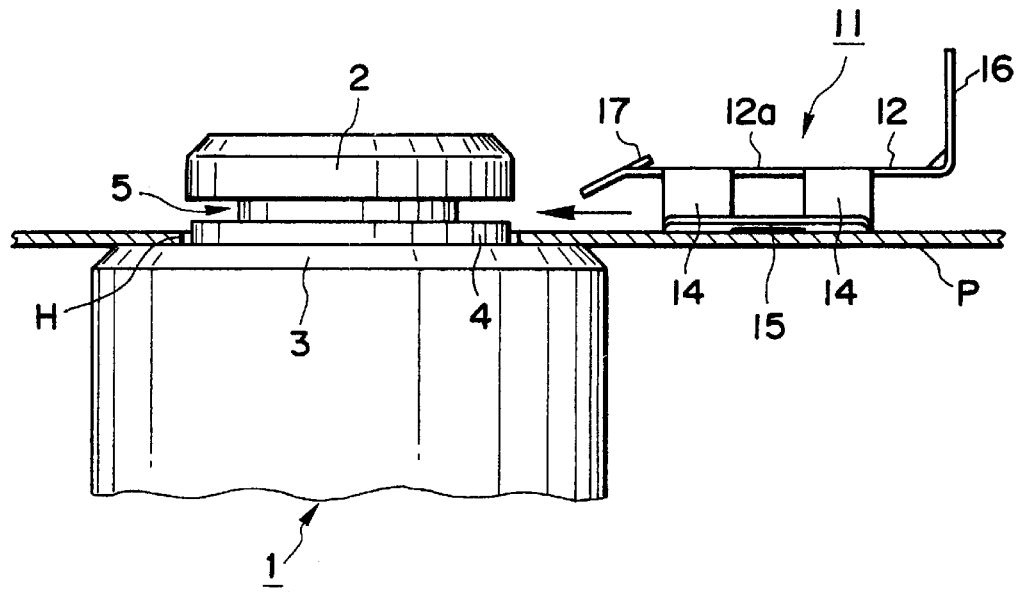
FIG. 4 is a longitudinal, cross-sectional view showing a state in which the panel is received by the receiving shoulder of the shaftlike member.

In the above structure, the shaftlike member 1 is also fixed to the panel P of the mount member in the following fashion. When the head 2 of the shaftlike member 1 is inserted into the through hole H of the panel P, the panel P is received by the receiving shoulder 3 with the larger diameter thereon as shown in FIG. 4. At the same time as it, the step 4 is fitted in the through hole H of the panel P. After that, the gripper 16 is gripped with a tool or the like; and, while the portion of the small-diameter groove 5 of the shaftlike member 1 is made to face the U-shaped slit 13 of the metal clip 11, the both side pieces 12a are inserted into the small-diameter groove 5, whereby the panel P and the shaftlike member 1 are also fixed through elasticity of the metal clip 11.

In the present embodiment, however, since the elastic legs 14 for pushing the both side pieces 12a up away from the surface of panel P are provided at the outer edges of the both side pieces 12a of the metal clip 11 as described previously, the free ends of the two side pieces 12a can be inserted into the small-diameter groove 5 while the two side pieces 12a are set largely away from the surface of panel P around the through hole H by the action of the elastic legs 14. Therefore, even if there is a burr at the edge of the through hole H of the panel P or even if the high step 4 projects outwardly from the surface of panel P, the free ends of the two side pieces 12a will be inserted on a smooth basis into the small-diameter groove 5 without being caught by the burr or the step 4. A rise amount of the two side pieces 12a is adjusted by deflection of the elastic legs 14 in the inward or outward direction.

While the two side pieces 12a are inserted into the small-diameter groove 5, turn center edges 14a at the tip of each elastic leg 14 provided front or rear are in contact with the surface of panel P. Each elastic leg 14 can move smoothly on the surface of panel P without damaging the surface of panel P and can be deflected smoothly inward or outward. Since there are two elastic legs 14 each front and rear, the side pieces 12a can be inserted into the small-diameter groove 5 in such a state that in the initial stage of insertion the front elastic legs 14 are mainly deflected and the body 12 is inclined forward. The structure of the invention thus facilitates the inserting work, also from this aspect.

Figure 5:
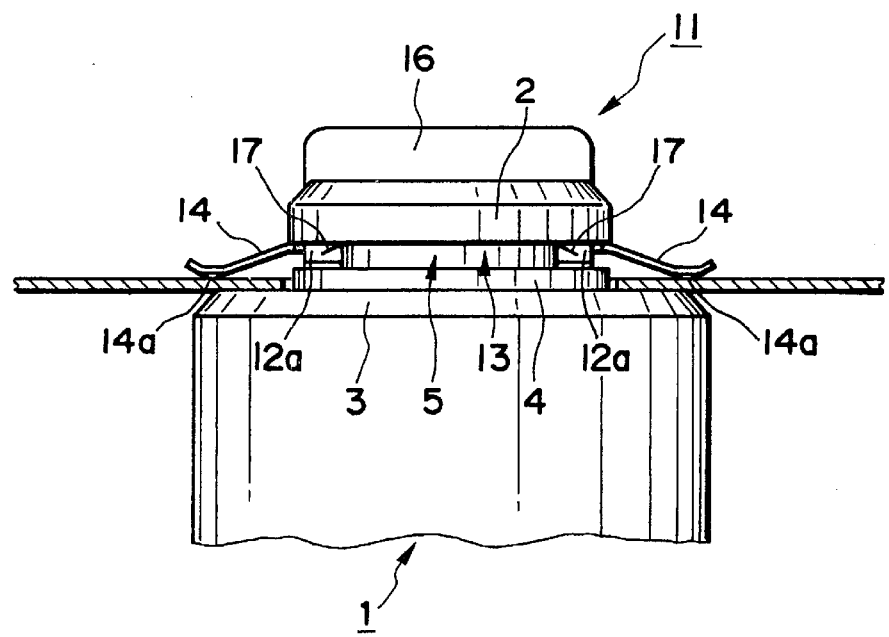
FIG. 5 is a longitudinal, cross-sectional view showing a state in which the panel and the shaftlike member are fixed through the metal clip.
Figure 6:
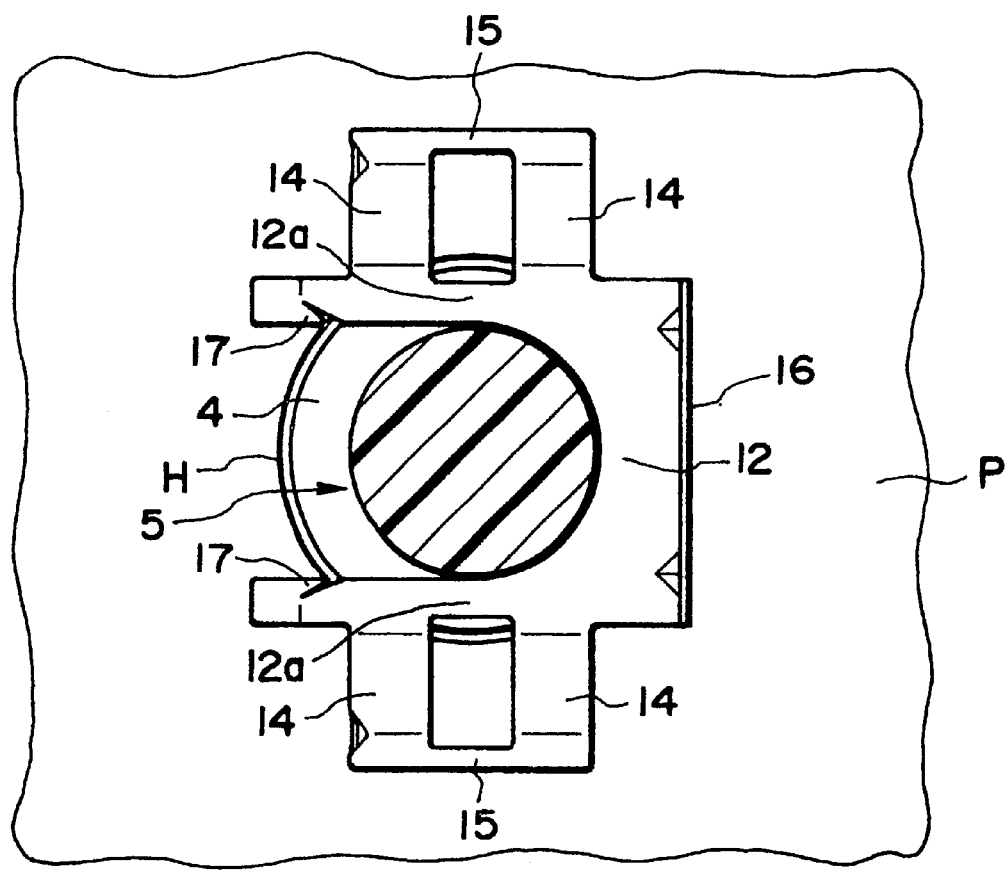
FIG. 6 is a top, cross-sectional view showing a state in which the panel and the shaftlike member are fixed through the metal clip.

Accordingly, once the both side pieces 12a of the metal clip 11 are completely inserted into the small-diameter groove 5, the elastic legs 14 on each side are elastically nipped by the bottom surface of the head 2 and the surface of panel P. Therefore, the panel P and the shaftlike member 1 are fixed through the elasticity of the metal clip 11 achieved from the nipping state as shown in FIG. 5 and FIG. 6.

In addition, since the present embodiment is arranged so that the height of the step 4 is set greater than the thickness of the panel P as described previously, the panel P can be held for sure by the projection of the step 4 out of the surface of panel P. This prevents the panel P in the fixed state from undesirably shaking or prevents the hole edge of the panel P from riding over the step 4 and making the fixed state unstable, different from the conventional structure. Further, in the fixed state of the panel P, the stopper claws 17 bite into the peripheral surface of the head 2, so that the metal clip 11 itself is prevented from slipping off from the shaftlike member 1 because of external force such as vibration.

Figure 7:
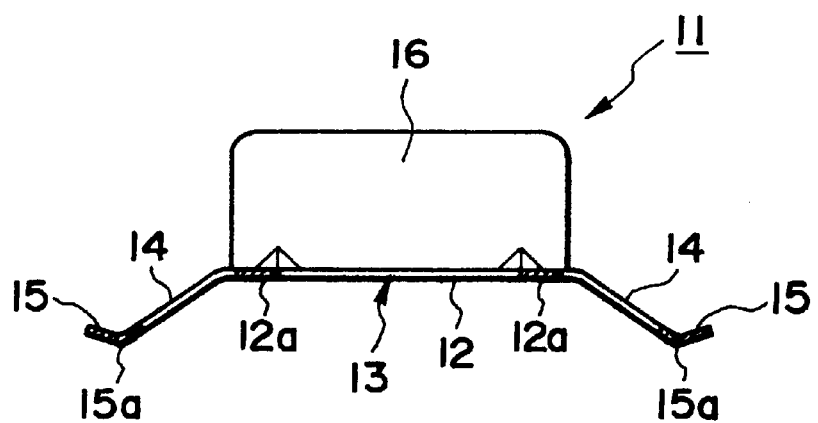
FIG. 7 is a cross-sectional view to show another example of the metal clip.

The above embodiment adopted the structure in which only the turn center edges 14a at the tip of each elastic leg 14 were in contact with the surface of panel P without contact of the connecting pieces 15 with the surface of panel P, but the present invention is by no means limited to this structure. For example, depending upon applications, the present invention may optionally adopt such a structure that, as shown in FIG. 7, the tip portions of each elastic leg 14 are completely connected by connecting pieces 15 folded back upward and the turn center edges 15a of the connecting pieces 15 are in contact with the surface of the panel P. Particularly in this case, since the long connecting pieces 15 themselves are continuously in contact with the surface of the panel P, this arrangement further improves the guiding property against the surface of the panel P and the deflecting property of the elastic legs 14 in the inward or outward direction.

As described above, the present invention, employing the above structure, permits the free ends of the both side pieces to be inserted into the small-diameter groove of the shaftlike member while keeping the both side pieces of the metal clip the necessary rise amount above the surface of the mount member by the action of the elastic legs even if there is the burr or the like at the edge of the through hole in the mount member; whereby the free ends of the both side pieces can be inserted smoothly into the small-diameter groove of the shaftlike member without being caught by the burr or the like. Therefore, the inserting work of the both side pieces of the metal clip can be done well.

In another aspect of the present invention, when the side pieces of the metal clip are inserted into the small-diameter groove, the insertion can be done by deflecting the elastic legs from the front elastic legs in the inserting direction to the rear end legs which make the operation more smooth. Also from this point, the present invention permits the inserting work to be done better. In another aspect of the present invention, the turn center edges of the elastic legs or the connecting pieces are in contact with the surface of the mount member, and there is thus such an advantage that the movement and the inward or outward deflection of the elastic legs can be guided without strain and without damaging the surface of the mount member.

In still another aspect of the present invention, the height of the step of the shaftlike member to fit the through hole of the mount member is greater than the thickness of the mount member, whereby the mount member can be held for sure. This can prevent the mount member in the fixed state from undesirably shaking and prevent the edge of the through hole of the mount member from riding over the step and making the fixed state unstable. While the both side pieces of the metal clip are inserted into the small-diameter groove of the shaft member, the free ends of the both side pieces can be inserted into the small-diameter groove while keeping the both side pieces the necessary rise amount above the surface of the mount member by the action of the elastic legs. Therefore, the free ends of the both side pieces can be inserted smoothly into the small-diameter groove without being caught even by the high step. Accordingly, the certainly fixed state is assured between the mount member and the shaftlike member and the inserting work of the both side pieces of the metal clip can be done well.

What is claimed is:

1. A metal clip for fixing a shaft-like member to a mount member having a through hole, said metal clip comprising;

a body having a U-shaped slit for receiving the shaft-like member in an inserting direction, said U-shaped slit being defined by two side pieces, said side pieces being provided with a plurality of elastic legs having tip portions, the tip portions of the elastic legs being connected by connecting pieces, said connecting pieces being folded back upward and turn center edges of the connecting pieces being contactable with a surface of the mount member, said elastic legs for pushing the two side pieces away from the surface of the mount member around said through hole in an upward direction, wherein said elastic legs are located at outer edges of the two side pieces and extend in a direction perpendicular to the inserting direction.

2. A combination of a shaft-like member and a fixing structure, for fixing the shaft-like member to a mount member having a through hole, with a metal clip, wherein the shaft-like member comprising: a head, to be inserted into the through hole of the mount member, formed at a tip of the shaft-like member; a receiving shoulder having a larger diameter than that of said through hole formed below the head; a step to fit said through hole formed on a top surface of said receiving shoulder; and an annular groove formed between the step and the head; the metal clip comprising a body having a U-shaped slit, for receiving the shaft-like member in an inserting direction, formed in an open shape in the body, the U-shaped slit being defined by two side pieces; and elastic legs for pushing the two side pieces up away from the surface of the mount member around the through hole, the elastic legs located at outer edges of the two side pieces and extending in a direction perpendicular to the inserting direction.

* * * * *